(12) United States Patent
Jeong

(10) Patent No.: US 11,689,823 B2
(45) Date of Patent: Jun. 27, 2023

(54) IMAGE SENSING DEVICE AND OPERATING METHOD THEREOF

(71) Applicant: SK hynix Inc., Gyeonggi-do (KR)

(72) Inventor: Hoe Sam Jeong, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 170 days.

(21) Appl. No.: 17/196,506

(22) Filed: Mar. 9, 2021

(65) Prior Publication Data

US 2022/0103766 A1 Mar. 31, 2022

(30) Foreign Application Priority Data

Sep. 29, 2020 (KR) ........................ 10-2020-0127124

(51) Int. Cl.
*H04N 5/369* (2011.01)
*H04N 9/04* (2006.01)
*H01L 27/146* (2006.01)
*H04N 25/46* (2023.01)
*H04N 25/11* (2023.01)

(52) U.S. Cl.
CPC ............. *H04N 25/46* (2023.01); *H04N 25/11* (2023.01)

(58) Field of Classification Search
None
See application file for complete search history.

(56) References Cited

U.S. PATENT DOCUMENTS

| | | | |
|---|---|---|---|
| 2005/0218296 A1* | 10/2005 | Spahn | H04N 5/3675 348/E3.02 |
| 2011/0063473 A1 | 3/2011 | Tsunekawa et al. | |
| 2020/0135780 A1* | 4/2020 | Hayashida | H04N 5/32 |

FOREIGN PATENT DOCUMENTS

KR 10-2014-0058738 5/2014

* cited by examiner

*Primary Examiner* — Mark T Monk
(74) *Attorney, Agent, or Firm* — IP & T Group LLP

(57) ABSTRACT

Disclosed is an image sensing device and an operating method thereof, the image sensing device including an image sensor suitable for generating first image signals, corresponding to some of a plurality of pixels, in a binning mode, and an image processor suitable for generating second image signals, corresponding to other pixels, by performing an interpolation operation based on the first image signals in the binning mode.

19 Claims, 4 Drawing Sheets

FIG. 1
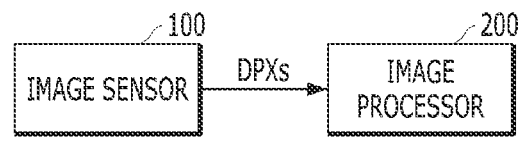
FIG. 2
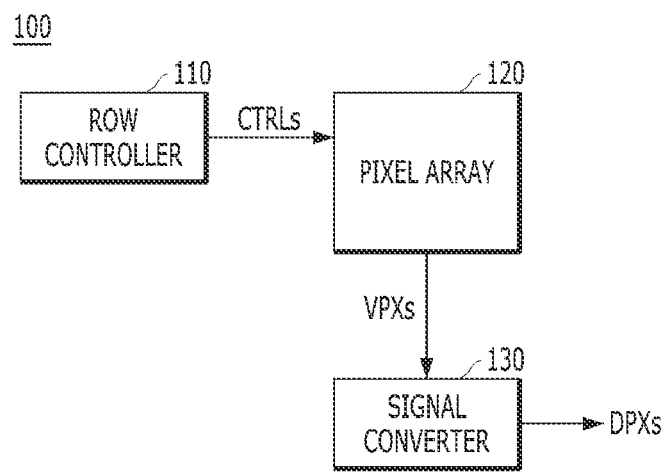
FIG. 3
| R | Gr |
|---|----|
| Gb | B |

FIG. 4

| R00 | Gr00 | R01 | Gr01 | R02 | Gr02 | R03 | Gr03 |
|---|---|---|---|---|---|---|---|
| Gb00 | B00 | Gb01 | B01 | Gb02 | B02 | Gb03 | B03 |
| R10 | Gr10 | R11 | Gr11 | R12 | Gr12 | R13 | Gr13 |
| Gb10 | B10 | Gb11 | B11 | Gb12 | B12 | Gb13 | B13 |
| R20 | Gr20 | R21 | Gr21 | R22 | Gr22 | R23 | Gr23 |
| Gb20 | B20 | Gb21 | B21 | Gb22 | B22 | Gb23 | B23 |
| R30 | Gr30 | R31 | Gr31 | R32 | Gr32 | R33 | Gr33 |
| Gb30 | B30 | Gb31 | B31 | Gb32 | B32 | Gb33 | B33 |
| R40 | Gr40 | R41 | Gr41 | R42 | Gr42 | R43 | Gr43 |
| Gb40 | B40 | Gb41 | B41 | Gb42 | B42 | Gb43 | B43 |
| R50 | Gr50 | R51 | Gr51 | R52 | Gr52 | R53 | Gr53 |
| Gb50 | B50 | Gb51 | B51 | Gb52 | B52 | Gb53 | B53 |
| R60 | Gr60 | R61 | Gr61 | R62 | Gr62 | R63 | Gr63 |
| Gb60 | B60 | Gb61 | B61 | Gb62 | B62 | Gb63 | B63 |
| R70 | Gr70 | R71 | Gr71 | R72 | Gr72 | R73 | Gr73 |
| Gb70 | B70 | Gb71 | B71 | Gb72 | B72 | Gb73 | B73 |

FIG. 5

| R00 | Gr00 | R01 | Gr01 | R02 | Gr02 | R03 | Gr03 |
|---|---|---|---|---|---|---|---|
| Gb00 | B00 | Gb01 | B01 | Gb02 | B02 | Gb03 | B03 |
| R10 | Gr10 | R11 | Gr11 | R12 | Gr12 | R13 | Gr13 |
| Gb10 | B10 | Gb11 | B11 | Gb12 | B12 | Gb13 | B13 |
| R20 | Gr20 | R21 | Gr21 | R22 | Gr22 | R23 | Gr23 |
| Gb20 | B20 | Gb21 | B21 | Gb22 | B22 | Gb23 | B23 |
| R30 | Gr30 | R31 | Gr31 | R32 | Gr32 | R33 | Gr33 |
| Gb30 | B30 | Gb31 | B31 | Gb32 | B32 | Gb33 | B33 |
| R40 | Gr40 | R41 | Gr41 | R42 | Gr42 | R43 | Gr43 |
| Gb40 | B40 | Gb41 | B41 | Gb42 | B42 | Gb43 | B43 |
| R50 | Gr50 | R51 | Gr51 | R52 | Gr52 | R53 | Gr53 |
| Gb50 | B50 | Gb51 | B51 | Gb52 | B52 | Gb53 | B53 |
| R60 | Gr60 | R61 | Gr61 | R62 | Gr62 | R63 | Gr63 |
| Gb60 | B60 | Gb61 | B61 | Gb62 | B62 | Gb63 | B63 |
| R70 | Gr70 | R71 | Gr71 | R72 | Gr72 | R73 | Gr73 |
| Gb70 | B70 | Gb71 | B71 | Gb72 | B72 | Gb73 | B73 |

FIG. 6

| R00 | Gr00 | R01 | Gr01 | R02 | Gr02 | R03 | Gr03 |
|-----|------|-----|------|-----|------|-----|------|
| Gb00 | B00 | Gb01 | B01 | Gb02 | B02 | Gb03 | B03 |
| R10 | Gr10 | R11 | Gr11 | R12 | Gr12 | R13 | Gr13 |
| Gb10 | B10 | Gb11 | B11 | Gb12 | B12 | Gb13 | B13 |
| R20 | Gr20 | R21 | Gr21 | R22 | Gr22 | R23 | Gr23 |
| Gb20 | B20 | Gb21 | B21 | Gb22 | B22 | Gb23 | B23 |
| R30 | Gr30 | R31 | Gr31 | R32 | Gr32 | R33 | Gr33 |
| Gb30 | B30 | Gb31 | B31 | Gb32 | B32 | Gb33 | B33 |
| R40 | Gr40 | R41 | Gr41 | R42 | Gr42 | R43 | Gr43 |
| Gb40 | B40 | Gb41 | B41 | Gb42 | B42 | Gb43 | B43 |
| R50 | Gr50 | R51 | Gr51 | R52 | Gr52 | R53 | Gr53 |
| Gb50 | B50 | Gb51 | B51 | Gb52 | B52 | Gb53 | B53 |
| R60 | Gr60 | R61 | Gr61 | R62 | Gr62 | R63 | Gr63 |
| Gb60 | B60 | Gb61 | B61 | Gb62 | B62 | Gb63 | B63 |
| R70 | Gr70 | R71 | Gr71 | R72 | Gr72 | R73 | Gr73 |
| Gb70 | B70 | Gb71 | B71 | Gb72 | B72 | Gb73 | B73 |

IMAGE SENSING DEVICE AND OPERATING METHOD THEREOF

CROSS-REFERENCE TO RELATED APPLICATION(S)

This application claims priority under 35 U.S.C. § 119 to Korean Patent Application No. 10-2020-0127124, filed on Sep. 29, 2020, the disclosure of which is incorporated herein by reference in its entirety.

BACKGROUND

1 Field

Various embodiments of the present disclosure relate to a semiconductor design technique, and more particularly, to an image sensing device and an operating method thereof.

2. Description of the Related Art

Image sensing devices are devices for capturing images using a property of a semiconductor which reacts to light. Image sensing devices may be roughly classified into charge-coupled device (CCD) image sensing devices and complementary metal-oxide semiconductor (CMOS) image sensing devices. Recently, CMOS image sensing devices are widely used because the CMOS image sensing devices can allow both analog and digital control circuits to be directly implemented on a single integrated circuit (IC).

SUMMARY

Various embodiments of the present disclosure are directed to an image sensing device that includes a circuit which is used in a normal mode and may be applied in a binning mode without a change in the circuit's design in order to achieve a high frame rate, and an operating method of the image sensing device.

In accordance with an embodiment, an image sensing device may include: an image sensor suitable for generating first image signals, corresponding to some of a plurality of pixels, in a binning mode; and an image processor suitable for generating second image signals, corresponding to other pixels, by performing an interpolation operation based on the first image signals in the binning mode.

In accordance with an embodiment, an operating method of an image sensing device may include: entering a binning mode; generating first image signals corresponding to some of a plurality of rows in which a plurality of pixels are arranged, by performing an analog binning operation; and generating second image signals corresponding to other rows, by performing interpolation and digital binning operations based on the first image signals.

In accordance with an embodiment, an operating method of an image sensing device may include: selecting a set number of rows from a plurality of rows in an image matrix with m rows and n columns, wherein m and n are a positive integer; selecting a set number of pixels from a plurality of pixels arranged in two or more rows adjacent to each other in the selected rows; performing an analog binning operation on pixel signals of the selected pixels to generate analog image signals; converting the analog image signals to digital image signals; and performing an interpolation operation on the digital image signals to generate second it mage signals corresponding to pixels arranged in remaining rows which are not selected in the selecting of the set number of rows.

BRIEF DESCRIPTION OF THE DRAWINGS

FIG. 1 is a block diagram illustrating an image sensing device in accordance with an embodiment of the present disclosure.

FIG. 2 is a block diagram illustrating an image sensor illustrated in FIG. 1.

FIG. 3 is a configuration diagram illustrating a portion of a pixel array illustrated in FIG. 2.

FIG. 4 is a configuration diagram illustrating a portion of a pixel array for describing an operation of the image sensing device illustrated in FIG. 1.

FIG. 5 is a configuration diagram illustrating a portion of a pixel array for describing another operation of the image sensing device illustrated in FIG. 1.

FIG. 6 is a configuration diagram illustrating a portion of a pixel array for describing still another operation of the image sensing device illustrated in FIG. 1.

DETAILED DESCRIPTION

Various embodiments are described below with reference to the accompanying drawings, so that those with ordinary skill in art to which the present disclosure pertains may easily carry out the technical spirit of the present disclosure.

It will be understood that when an element is referred to as being "connected to" or "coupled to" another element, the element may be directly connected to or coupled to the another element, or electrically connected to or coupled to the another element with one or more elements interposed therebetween. In addition, it will also be understood that the terms "comprises," "comprising," "includes," and "including" when used in this specification do not preclude the presence of one or more other elements, but may further include the one or more other elements, unless stated otherwise. In the description throughout the specification, some components are described in singular forms, but the present disclosure is not limited thereto, and it will be understood that the components may be formed in plural.

FIG. 1 is a block diagram illustrating an image sensing device in accordance with an embodiment of the present disclosure.

Referring to FIG. 1, the image sensing device may include an image sensor 100 and an image processor 200.

The image sensor 100 may generate image signals DPXs, corresponding to incident light, in normal and binning modes.

For example, the image sensor 100 may operate all of a plurality of pixels arranged in a matrix row by row during a frame period in the normal mode, and generate the image signals DPXs corresponding to a raw image. The image signals DPXs generated in the normal mode may correspond to pixel signals (e.g., pixel values) of the plurality of pixels, respectively.

For example, the image sensor 100 may operate only some of the plurality of pixels for each group of selected rows during the frame period in the binning mode, and generate the image signals DPXs corresponding to a processed image. The processed image may be smaller in size than the raw image. The size may refer to a resolution of the processed image, and the processed image may be a high definition (HD) image, a full HD image, or the like. Each of the image signals DPXs generated in the binning mode may be obtained by calculating an average of pixel signals read out from at least two of the some pixels. Hereinafter, the image signals DPXs generated from the image sensor 100 in the binning mode will be referred to as first image signals DPXs. The image sensor 100 may generate the first image signals DPXs by performing an analog binning operation in the binning mode. The analog binning operation may include an operation of calculating an average of at least two analog pixel signals.

The image processor 200 may process the image signals DPXs during the frame period in the normal and binning modes.

For example, the image processor 200 may generate a normal image corresponding to the raw image, based on the image signals DPXs in the normal mode.

Further, the image processor 200 may generate a binning image corresponding to the processed image, based on the first image signals DPXs in the binning mode. Particularly, the image processor 200 may generate second image signals, corresponding to the other pixels, by performing interpolation and digital binning operations on the first image signals DPXs in the binning mode. For example, the image processor 200 may generate third image signals by performing the digital binning operation on the first image signals DPXs, and generate the second image signals by performing the interpolation operation on the third image signals.

FIG. 2 is a block diagram illustrating the image sensor 100 illustrated in FIG. 1.

Referring to FIG. 2, the image sensor 100 may include a row controller 110, a pixel array 120 and a signal converter 130.

The row controller 110 may generate row control signals CTRLs for controlling all of a plurality of rows in which the plurality of pixels are arranged, row by row in the normal mode. The row controller 110 may generate row control signals CTRLs for controlling some of the plurality of rows for each group of rows in the binning mode.

The pixel array 120 may include the plurality of pixels arranged in row and column directions. The pixel array 120 may generate analog pixel signals VPXs under the control of the row controller 110. For example, the pixel array 120 may generate the pixel signals VPXs row by row in the normal mode, and generate the pixel signals VPXs for each group of rows in the binning mode. Each of the pixel signals VPXs generated in the binning mode may be a signal corresponding to an average of at least two pixel signals, according to the analog binning operation.

The signal converter 130 may generate digital image signals DPXs based on the pixel signals VPXs. For example, the signal converter 130 may generate the image signals DPXs corresponding to the pixel signals VPXs, row by row in the normal mode, and generate first image signals DPXs corresponding to the pixel signals VPXs for each group of rows in the binning mode. The signal converter 130 may include an analog to digital converter.

FIG. 3 is a diagram illustrating a portion of the pixel array 120 illustrated in FIG. 2.

Referring to FIG. 3, the pixel array 120 may be arranged in a set pattern. For example, the pixel array 120 may be arranged in a Bayer pattern. The Bayer pattern may be composed of repeating cells of 2×2 pixels. In each of the cells, two pixels Gr and Gb each having a green color filter may be disposed to diagonally face each other at corners thereof, and a pixel R having a red color filter and a pixel B having a blue color filter may be disposed to diagonally face each other at the remaining corners.

Hereinafter, an operation of the image sensing device in accordance with the present embodiment, which has the above-described configuration, will be described with reference to FIGS. 4 to 6. In the present embodiment, only an operation according to the binning mode will be described.

First, an overall operating method of the present disclosure may include entering the binning mode, generating the first image signals DPXs which corresponds to some of the plurality of rows in which the plurality of pixels are arranged, by performing the analog binning operation, and generating the second image signals, corresponding to the other rows, by performing the interpolation and digital binning operations based on the first image signals DPXs. Hereinafter, the analog binning operation, the digital binning operation and the interpolation operation will be described according to examples.

FIG. 4 is a diagram illustrating a portion of the pixel array 120 for describing an operation of the image sensing device illustrated in FIG. 1.

Referring to FIG. 4, the some rows may include first to fourth rows and ninth to 12th rows, and the other rows may include fifth to eighth rows and 13th to 16th rows. It may be seen that the some rows and the other rows are regularly mixed. Hereinafter, for convenience in description, a process of generating a second image signal corresponding to 2×2 pixels, i.e., R20, R21, R30 and R31, each having a red color filter among the pixels included in the other rows will be representatively described.

The second image signal corresponding to the 2×2 pixels R20, R21, R30 and R31 may be generated by performing the interpolation operation. More specifically, an image value of the second image signal corresponding to the 2×2 pixels R20, R21, R30 and R31 may be calculated according to the following Equation 1.

$$(R20+R21+R30+R31)/4 = \tfrac{1}{2}*(R00+R01+R10+R11)/4 + \tfrac{1}{2}*(R40+R41+R50+R51)/4 \quad \text{[Equation 1]}$$

Herein, "(R20+R21+R30+R31)/4" may be an image value of the second image signal corresponding to the 2×2 pixels R20, R21, R30 and R31, "(R00+R01+R10+R11)/4" may be an image value of a first upper image signal corresponding to 2×2 pixels R00, R01, R10 and R11 arranged in the first and third rows among the some rows, and "(R40+R41+R50+R51)/4" may be an image value of a first lower image signal corresponding to 2×2 pixels R40, R41, R50 and R51 arranged in the ninth and $11^{th}$ rows among the some rows.

The sum of image values arranged in the same column among image values used to generate the first upper image signal, that is, each of "(R00+R10)/2" and "(R01+R11)/2" may be obtained from the analog binning operation, and a total image value used to generate the first upper image signal, that is, "{(R00+R01)+(R10+R11)}/4" may be obtained from the digital binning operation. The sum of image values arranged in the same column among image values used to generate the first lower image signal, that is, each of "(R40+R50)/2" and "(R41+R51)/2" may be obtained from the analog binning operation, and a total image value used to generate the first lower image signal, that is, "{(R40+R41)+(R50+R51)}/4" may be obtained from the digital binning operation.

FIG. 5 is a diagram illustrating a portion of the pixel array 120 for describing another operation of the image sensing device illustrated in FIG. 1.

Referring to FIG. 5, the some rows may include first, third, sixth, eighth, ninth, $11^{th}$, $14^{th}$ and $16^{th}$ rows, and the other rows may include second, fourth, fifth, seventh, $10^{th}$, $12^{th}$, $13^{th}$ and $15^{th}$ rows. It may be seen that the some rows and the other rows are irregularly mixed. Hereinafter, for convenience in description, a process of generating a second image signal corresponding to 2×2 pixels, i.e., Gr20, Gr21, Gr30 and Gr31, each having a green color filter among the pixels arranged in the other rows will be representatively described.

The second image signal corresponding to the 2×2 pixels Gr20, Gr21, Gr30 and Gr31 may be generated by performing the interpolation operation. More specifically, an image value of the second image signal corresponding to the 2×2 pixels Gr20, Gr21, Gr30 and Gr31 may be calculated according to the following Equation 2.

$(Gr20+Gr21+Gr30+Gr31)/4=\frac{1}{2}*(Gr00+Gr01+Gr10+Gr11)/4+\frac{1}{2}*(Gr40+Gr41+Gr50+Gr51)/4$  [Equation 2]

Herein, "(Gr20+Gr21+Gr30+Gr31)/4" may be an image value of the second image signal corresponding to the 2×2 pixels Gr20, Gr21, Gr30 and Gr31, "(Gr00+Gr01+Gr10+Gr11)/4" may be an image value of a first upper image signal corresponding to 2×2 pixels Gr00, Gr01, Gr10 and Gr11 arranged in the first and third rows among the some rows, and "(Gr40+Gr41+Gr50+Gr51)/4" may be an image value of a first lower image signal corresponding to 2×2 pixels ltd Gr40, Gr4l, Gr50 and Gr5l arranged in the ninth and 11$^{th}$ rows among the some rows.

The sum of image values arranged in the same column among image values used to generate the first upper it mage signal, that is, each of "(Gr00+Gr10)/2" and "(Gr01+Gr11)/2" may be obtained from the analog binning operation, and a total image value used to generate the first upper image signal, that is, "{(Gr00+Gr01)+(Gr10+Gr11)}/4" may be obtained from the digital binning operation. The sum of image values arranged in the same column among image values used to generate the first lower image signal, that is, each of "(Gr40+Gr50)/2" and "(Gr41+Gr51)/2" may be obtained from the analog binning operation, and a total image value used to generate the first lower image signal, that is, "{(Gr40+Gr41)+(Gr50+Gr51)}/4" may be obtained from the digital binning operation.

FIG. 6 is a diagram illustrating a portion of the pixel array 120 for describing still another operation of the image sensing device illustrated in FIG. 1.

Referring to FIG. 6, the some rows may include first, third, sixth, eighth, ninth, 11$^{th}$, 14$^{th}$ and 16$^{th}$ rows, and the other rows may include second, fourth, fifth, seventh, 10$^{th}$, 12$^{th}$, 13$^{th}$ and 15$^{th}$ rows. It may be seen that the some rows and the other rows are irregularly mixed. Hereinafter, for convenience in description, a process of generating a second image signal corresponding to 2×2 pixels, i.e., Gr20, Gr21, Gr30 and Gr31, each having a green color filter among the pixels arranged in the other rows will be representatively described.

The second image signal corresponding to the 2×2 pixels Gr20, Gr21, Gr30 and Gr31 may be generated by performing the interpolation operation. More specifically, an image value of the second image signal corresponding to the 2×2 pixels Gr20, Gr21, Gr30 and Gr31 may be calculated according to the following Equation 3.

$(Gr20+Gr21+Gr30+Gr31)/4=p(\frac{1}{2}*(Gr00+Gr01+Gr10+Gr11)/4+\frac{1}{2}*(Gr40+Gr41+Gr50+Gr51)/4)+(1-p)*f(Gb20,Gb30,Gb21,Gb31,Gb22,Gb32)$  [Equation 3]

Herein, "(Gr20+Gr21+Gr30+Gr31)/4" may be an image value of the second image signal corresponding to the 2×2 pixels Gr20, Gr21, Gr30 and Gr31, "(Gr00+Gr01+Gr10+Gr11)/4" may be an image value of a first upper image signal corresponding to 2×2 pixels Gr00, Gr01, Gr10 and Gr11 arranged in the first and third rows among the some rows, and "(Gr40+Gr41+Gr50+Gr51)/4" may be an image value of a first lower image signal corresponding to 2×2 pixels Gr40, Gr41, Gr50 and Gr51 arranged in the ninth and 11$^{th}$ rows among the some rows. "p", which is a weight, may have a value between "0" and "1" (0≤p≤1). "f(Gb20,Gb30,Gb21,Gb31,Gb22,Gb32)", which is a function for interpolation, may be an image value of an image signal corresponding to 3×2 pixels Gb20, Gb30, Gb21, Gb31, Gb22 and Gb32. The 3×2 pixels Gb20, Gb30, Gb21, Gb31, Gb22 and Gb32 may be arranged closest to the 2×2 pixels Gr20, Gr21, Gr30 and Gr31, and each of the 3×2 pixels Gb20, Gb30, Gb21, Gb31, Gb22 and Gb32 has a green color filter. As the function for interpolation is applied to generate the second image signal, it may be more advantageous in terms of brightness, compared to FIG. 5.

The sum of image values arranged in the same column among image values used to generate the first upper image signal, that is, each of "(Gr00+Gr10)/2" and "(Gr01+Gr11)/2" may be obtained from the analog binning operation, and a total image value used to generate the first upper image signal, that is, "{(Gr00+Gr01)+(Gr10+Gr11)}/4" may be obtained from the digital binning operation. The sum of image values arranged in the same column among image values used to generate the first lower image signal, that is, each of "(Gr40+Gr50)/2" and "(Gr41+Gr51)/2" may be obtained from the analog binning operation, and a total image value used to generate the first lower image signal, that is, "{(Gr40+Gr41)+(Gr50+Gr51)}/2" may be obtained from the digital binning operation, "f(Gb20,Gb30,Gb21,Gb31,Gb22,Gb32)" may be calculated according to the following Equation 4.

$(Gb20+GB30)/2=A,$ $(Gb21+Gb31)/2=B,$ $(Gb22+Gb32)/2=C,$ $f(Gb20,Gb30,Gb21,Gb31,Gb22,Gb32)=\frac{1}{3}*(A+B+C)$ or $=\frac{1}{4}*A+\frac{1}{2}*B+\frac{1}{4}*C$  [Equation 4]

Herein, each of "(Gb20+GB30)/2", "(Gb21+Gb31)/2" and "(Gb22+Gb32)/2" may be obtained from the analog binning operation, and "⅓ (A+B+C)" or "¼*A+½*B+¼*C" may be obtained from the digital binning operation.

According to an embodiment of the present disclosure, since a readout operation and a signal conversion operation for the other rows may be omitted in the binning mode, a high frame rate can be achieved.

According to an embodiment of the present disclosure, a high frame rate can be achieved while applying in a binning mode a circuit, which is used in a normal mode, without a change in design, thereby reducing the design cost and obtaining an image with improved image quality at high speed in the binning mode.

While the present disclosure has been illustrated and described with respect to specific embodiments, the disclosed embodiments are provided for description, and are not intended to be restrictive. Further, it is noted that the present disclosure may be achieved in various ways through substitution, change, and modification that fall within the scope of the following claims, as those skilled in the art will recognize in light of the present disclosure.

What is claimed is:
1. An image sensing device comprising:
an image sensor suitable for generating first image signals corresponding to some of a plurality of pixels and not generating second image signals corresponding to other pixels of the plurality of pixels, in a binning mode; and an image processor suitable for generating the second image signals by performing an interpolation operation based on the first image signals in the binning mode.

2. The image sensing device of claim 1, wherein the some of the plurality of pixels include pixels arranged in some of a plurality of rows in which the plurality of pixels are arranged, and the other pixels include pixels arranged in other rows.

3. The image sensing device of claim 2, wherein the some of the plurality of rows include one or more rows of a first group of rows and one or more rows of a second group of rows, and the other rows include one or more rows of a third group of rows between the first group of rows and the second group of rows.

4. The image sensing device of claim 1, wherein the image sensor generates the first image signals by performing an analog binning operation, and the image processor generates the second image signals by performing a digital binning operation.

5. The image sensing device of claim 4, wherein the analog binning operation includes an operation of calculating an average of analog pixel signals.

6. The image sensing device of claim 4, wherein the digital binning operation includes an operation of calculating an average of a digital type of the first image signals.

7. An operating method of an image sensing device, comprising:

entering a binning mode;

generating first image signals corresponding to some of a plurality of rows in which a plurality of pixels are arranged, by performing an analog binning operation; and generating second image signals corresponding to other rows, by performing interpolation and digital binning operations based on the first image signals, wherein the some of the plurality of rows include a first group of rows and a second group of rows, and the other rows include a third group of rows between the first group of rows and the second group of rows.

8. The operating method of claim 7, wherein the generating of the second image signals includes:

generating third image signals by performing the digital binning operation based on the first image signals; and generating the second image signals by performing the interpolation operation based on the third image signals.

9. The operating method of claim 7, wherein the analog binning operation includes an operation of calculating an average of analog pixel signals.

10. The operating method of claim 7, wherein the digital binning operation includes an operation of calculating an average of a digital type of the first image signals.

11. The operating method of claim 7, wherein the first to third groups of rows are regularly mixed.

12. The operating method of claim 7, wherein the first to third groups of rows have the same color filter pattern.

13. The operating method of claim 7, wherein the some of the plurality of rows further include a fourth group of rows between the first group of rows and the second group of rows, and wherein the fourth group of rows are different from the third group of rows.

14. The operating method of claim 13, wherein the first to fourth groups of rows are irregularly mixed.

15. A method for performing a binning operation in an image sensing device, the method comprising:

selecting a set number of rows from a plurality of rows in an image matrix with m rows and n columns, wherein m and n are a positive integer;

selecting a set number of pixels from a plurality of pixels arranged in two or more rows adjacent to each other in the selected rows;

performing an analog binning operation on pixel signals of the selected pixels to generate analog image signals;

converting the analog image signals to digital image signals; and performing an interpolation operation on the digital image signals to generate second image signals corresponding to pixels arranged in remaining rows which are not selected in the selecting of the set number of rows.

16. The method of claim 15, wherein the selecting the set number of pixels comprises, selecting a first group of pixels horizontally and vertically adjacent to each other from the plurality of pixels arranged in the two or more rows adjacent to each other in the selected rows; and selecting a second group of pixels horizontally and vertically adjacent to each other from the plurality of pixels arranged in the two or more rows adjacent to each other in the selected rows.

17. The method of claim 16, wherein the analog binning operation is performed on the pixel signals of both of the first group of pixels and the second group of pixels.

18. The method of claim 16, wherein the two or more rows having the first group of pixels are different from the two or more rows having the second group of pixels.

19. The method of claim 18, wherein the remaining rows are arranged between the two or more rows having the first group of pixels and the two or more rows having the second group of pixels.

* * * * *